Figure 1:
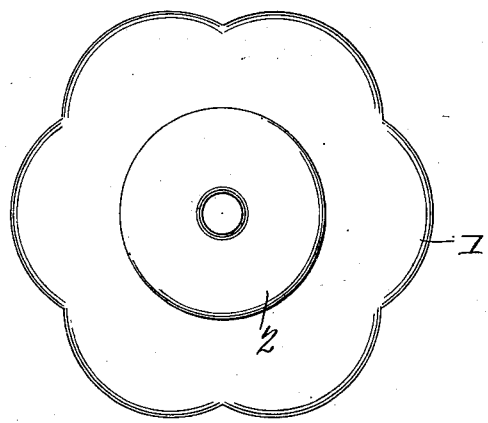

No. 732,658. PATENTED JUNE 30, 1903.
F. A. SCHULTZ.
RUBBER ERASER.
APPLICATION FILED OCT. 4, 1902.

NO MODEL.

Witnesses:

F. A. Schultz, Inventor:
by C. A. Snow & Co
Attorneys.

No. 732,658. Patented June 30, 1903.

UNITED STATES PATENT OFFICE.

FREDERICK A. SCHULTZ, OF HASBROUCK HEIGHTS, NEW JERSEY, ASSIGNOR TO MATTSON RUBBER COMPANY, OF NEW YORK, N. Y.

RUBBER ERASER.

SPECIFICATION forming part of Letters Patent No. 732,658, dated June 30, 1903.

Application filed October 4, 1902. Serial No. 125,941. (No model.)

*To all whom it may concern:*

Be it known that I, FREDERICK A. SCHULTZ, a citizen of the United States, residing at Hasbrouck Heights, in the county of Bergen and State of New Jersey, have invented a new and useful Rubber Eraser, of which the following is a specification.

This invention relates to rubber erasers.

The object of the invention is in a ready, simple, thorougly feasible and practical manner and without increasing the cost of the article to obviate the objectionable features resulting from the employment of metallic disks in strengthening and reinforcing thin rubber erasers, such as employed by type-writer operators; furthermore, to obviate waste which results from the rigid assemblage of the ordinary disks with the rubber, owing to the fact that without the employment of tools such as are not at the disposal of the operator they cannot be detached.

The ordinary disk or circular ink-eraser employed by type-writer operators is made from a thin sheet of rubber having abrasive material associated therewith, and in order to render it sufficiently rigid for practical purposes it is reinforced by metallic disks of less diameter than the rubber and held assembled therewith by an eyelet. While thoroughly effective for the purposes designed, these disks are objectionable for the reason that, being made of brass, in use they impart a disagreeable odor to the fingers, and, further, owing to the presence of sulfur in the rubber become oxidized. Furthermore, the disks are associated with the eraser in such manner as to render their separation therefrom exceedingly difficult, so that in the majority of cases an area of rubber equal to the diameter of the disks is wasted. With the construction of the present invention this objection is obviated in a simple, inexpensive, and practical manner and is effected by the employment of non-corrosive reinforcing-disks secured to the rubber by cement. The disks may be made of any suitable material, such as celluloid, bone, papier-mâché, wood fabric, or any other non-corrosive material suitable for the purpose. It will be seen that the employment of such substances will eliminate the objectionable features above mentioned without any added cost to the product.

With the above-stated and other objects in view the invention consists in the novel construction and combination of parts of a rubber eraser, as will be hereinafter fully described and claimed.

In the accompanying drawings, forming a part of this specification, and in which like numerals of reference indicate corresponding parts, there is illustrated one form of embodiment of invention capable of carrying the same into practical operation, it being understood that the elements therein exhibited may be varied or changed as to shape, proportion, and exact manner of assemblage without departing from the spirit thereof.

Figure 2:
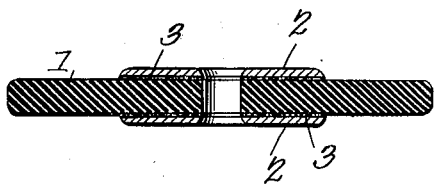

In the drawings, Figure 1 is a view in elevation of a rubber eraser constructed in accordance with the present invention. Fig. 2 is a view in vertical longitudinal section.

The eraser consists of a rubber body portion 1 and the reinforcing-disks 2. The rubber body may be made in rosette form, as herein shown, or any other configuration. The reinforcing-disks 2 are constructed from a material that will not corrode from the perspiration of the hand of the user and may be of celluloid, bone, wood fiber, or any other composition of matter suited to the purpose and are attached to the body by a layer of cement 3.

In use the disks will be thoroughly effective in reinforcing the body, and when the latter has worn down to the edges of the disks these may be removed by inserting the point of a knife beneath them and the body, thus enabling the operator to use up practically the entire piece of rubber.

While the improvement herein defined is simple, it will be found thoroughly efficient for the purpose described and will in a practical manner obviate the objection inherent to the use of erasers of the character specified.

Having thus described the invention, what is claimed is—

A rubber eraser comprising a body portion of the flat-disk type, and reinforcing-disks cemented thereto and composed of a non-corrosive material.

In testimony that I claim the foregoing as my own I have hereto affixed my signature in the presence of two witnesses.

FREDERICK A. SCHULTZ.

Witnesses:
J. HENRY BEHRENS,
GEO. DAVIES.